United States Patent [19]

Scheffel et al.

[11] 4,073,262
[45] Feb. 14, 1978

[54] APPARATUS FOR THE MANUFACTURE OF THE MAGNETIC COATINGS OF MAGNETIC DISKS

[75] Inventors: Dieter Scheffel, Neuhofen; Volker Richter, Heidelberg, both of Germany

[73] Assignee: BASF Aktiengesellschaft, Germany

[21] Appl. No.: 740,088

[22] Filed: Nov. 9, 1976

[30] Foreign Application Priority Data

Dec. 5, 1975 Germany ............................ 2554692

[51] Int. Cl.² ........................................... B05C 11/08
[52] U.S. Cl. ..................................... 118/52; 118/316; 118/319
[58] Field of Search ..................... 118/52, 56, 316, 319

[56] References Cited

U.S. PATENT DOCUMENTS

| | | | |
|---|---|---|---|
| 2,632,725 | 3/1953 | Marks et al. | 118/52 X |
| 3,705,048 | 12/1972 | Staunton | 118/52 X |
| 3,760,822 | 9/1973 | Evans | 118/52 X |
| 4,033,288 | 7/1977 | Woellhaf et al. | 118/52 |

Primary Examiner—Wm. Carter Reynolds
Attorney, Agent, or Firm—Keil, Thompson & Shurtleff

[57] ABSTRACT

Apparatus for the manufacture of the magnetic coatings of magnetic disks consisting essentially of a clamp/drive unit for the base plate to be coated, a unit for applying the magnetic dispersion, and flat covering elements which rotate during centrifuging of the coated base plate in the same direction as said base plate and at a short distance from the surfaces thereof.

5 Claims, 3 Drawing Figures

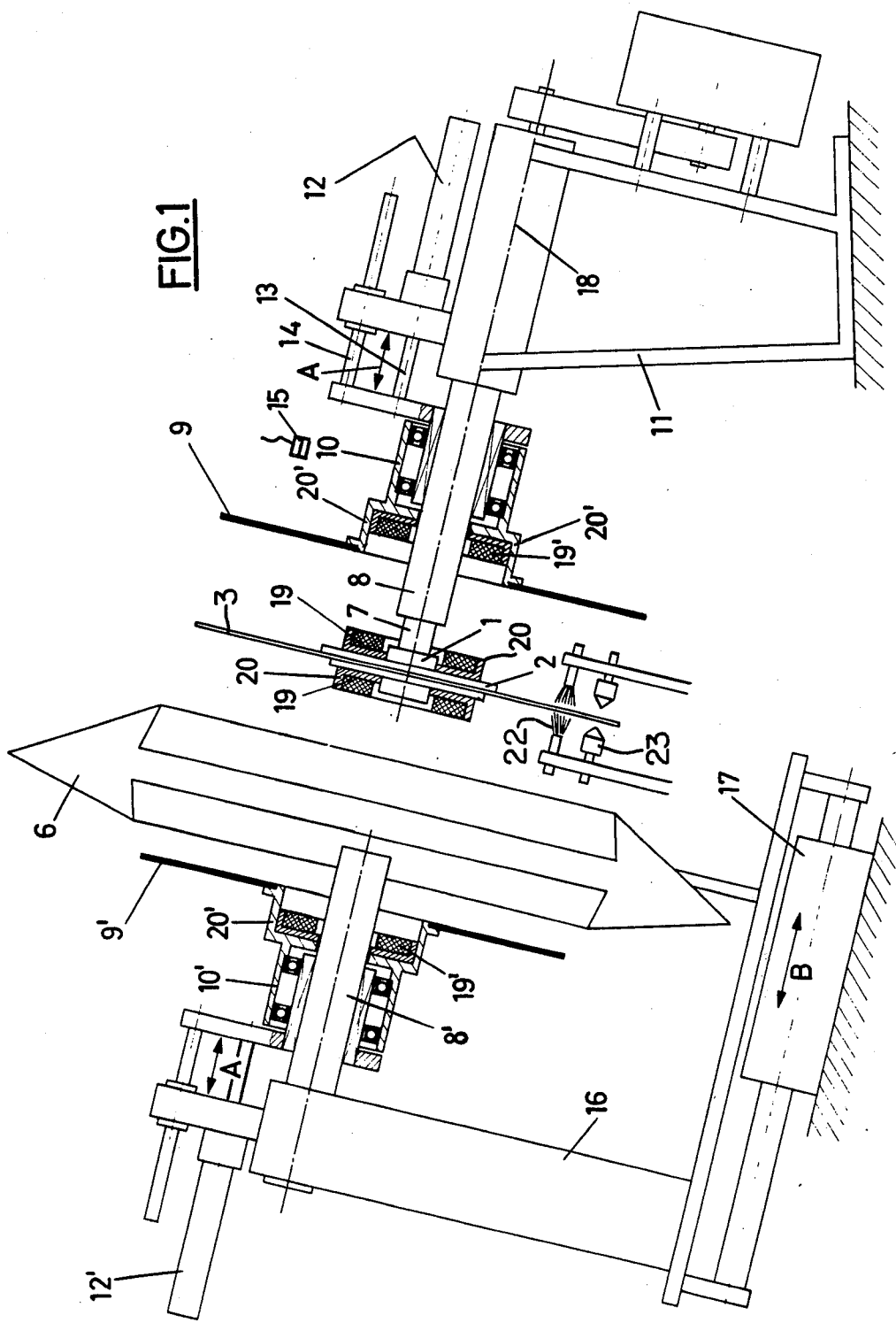

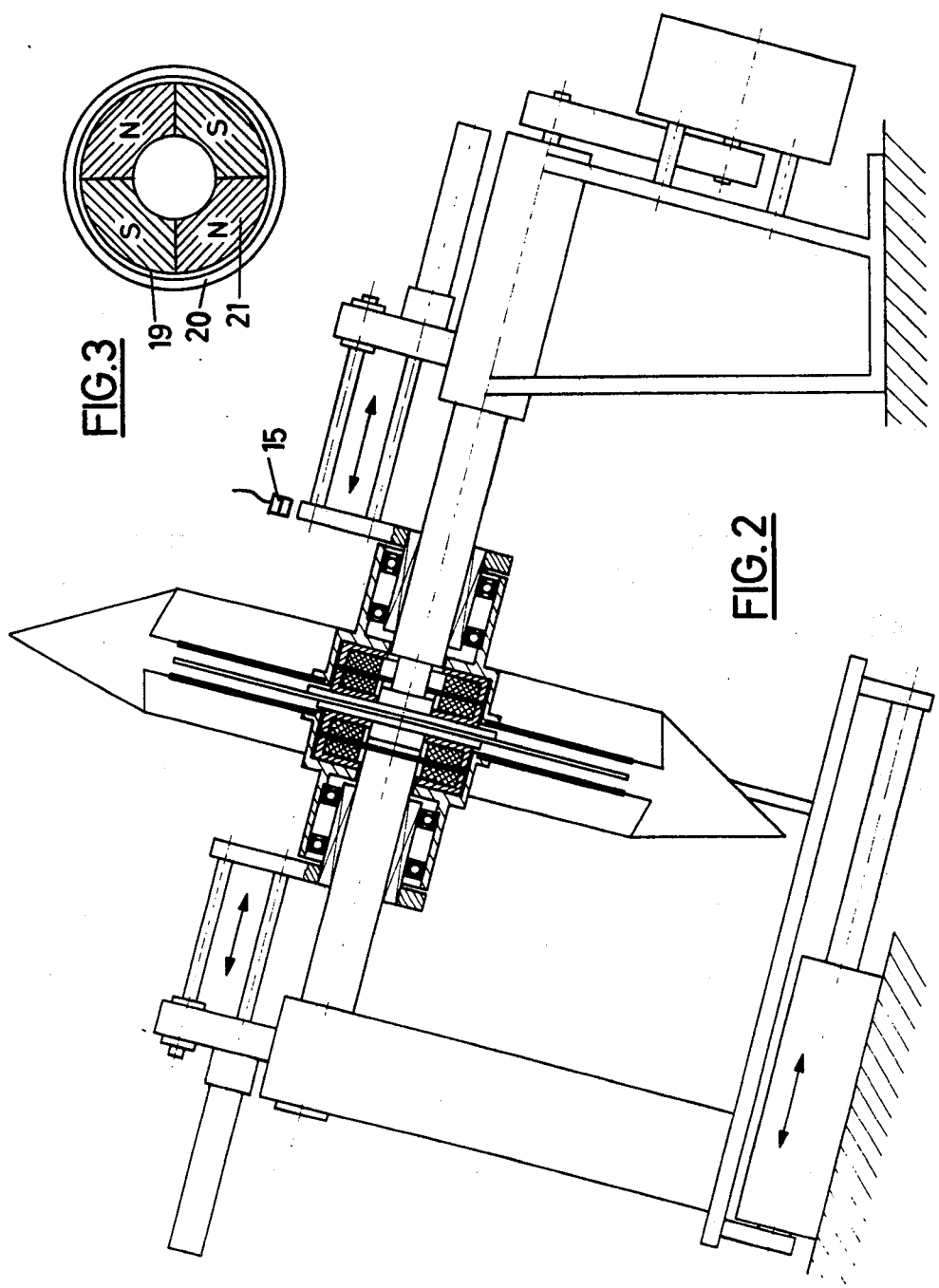

APPARATUS FOR THE MANUFACTURE OF THE MAGNETIC COATINGS OF MAGNETIC DISKS

This invention relates to an apparatus for the manufacture of the magnetic coatings of magnetic disks by the application of a pourable magnetic dispersion to a rotating base plate which is then centrifuged, which apparatus consists of a clamp/drive unit for the base plate to be coated, means for cleaning the base plate and a unit for applying the magnetic dispersion.

It is known to manufacture magnetic disks by the spin-coating process, in which, as described in U.S. Pat. No. 3,198,657, a rotating base plate, e.g. of aluminum, is cleaned and the magnetic dispersion is applied to one side thereof by means of a nozzle which moves radially over the base plate. The base plate is then rotated at high speed, so that the magnetic dispersion is distributed uniformly over the surface of the disk under the action of the centrifugal forces produced. The disk is then turned over and its other side coated in the same manner. German Published Application 2,157,650 discloses a method and apparatus with which both sides of the base plate are coated simultaneously and in the same manner.

As is well known, very high demands are placed on the magnetic coatings of magnetic disks, particularly as regards the smoothness of the surface of the coating and the uniformity of the layer thickness. The tendency toward increasingly higher storage capacities means that the distance between the magnetic disk and the magnetic head flying above it is becoming increasingly smaller.

Furthermore, high storage capacities require very thin magnetic layers, coatings as thin as about $1\mu m$ being desirable. However, variations in the thickness of the magnetic coating, for example coating streaks produced during centrifuging, become more noticeable in the form of fluctuations in the read voltage as the thickness of the magnetic coating is reduced. Such fluctuations in the read voltage are amplified by the unsteady flight of the magnetic head which is due to the surface of the coating not being plane enough. It is therefore desirable to produce magnetic coatings of absolutely constant thickness and having very smooth surfaces.

The magnetic disks manufactured by the processes described above have such undesirable coating streaks which cannot be removed to the desired extent even when the disks are subjected to an intensive surface treatment. These coating streaks are primarily caused by air currents produced by the rapid rotation of the base plates immediately after the magnetic dispersion has been applied thereto, which air currents act on the still fluid magnetic dispersion.

It is an object of the present invention to provide an apparatus with which the formation of undesirable coating streaks in the manufacture of magnetic coatings is obviated.

According to the invention this object is achieved by arranging flat covering elements at a short distance from the surfaces of the base plate to be coated, which covering elements rotate with the base plate in the same direction during the centrifugal coating operation.

In a further embodiment of the apparatus of the invention, the covering elements are mounted on the shaft of the clamp/drive unit for the base plate coaxially with said shaft and are axially movable thereon.

In yet another embodiment of the apparatus of the invention, the base plate to be coated and the flat covering elements are interconnected by means of a clutch whose parts are not in contact with one another. This clutch preferably consists of at least one magnet rigidly connected to each side of the base plate and of at least one magnet rigidly connected to each of the covering elements, these magnets being arranged axially opposite each other at a short distance from one another.

In a preferred embodiment of the apparatus, the covering elements are in the form of disks having a diameter which is at least equal to that of the base plate. The cover disks may also be in the form of further base plates to be coated.

It has been found that the use of a cover disk disposed at a short distance from the base plate to be coated and rotating therewith forms an aerodynamic boundary layer above the base plate, in which layer the air rotates with the base plate and is substantially stationary in relationship thereto. With the apparatus of the invention a boundary layer is formed which is of such a thickness that no air currents are produced which have an undesirable effect on the magnetic dispersion spreading over the surface of the plate with respect to uniformity of layer thickness and surface smoothness.

The apparatus of the invention is described below with reference to an embodiment illustrated in the drawings, in which FIG. 1 is a cross-sectional view of the apparatus along the longitudinal axis, with the cover disks in the position of rest, FIG. 2 is a cross-sectional view of the apparatus along the longitudinal axis, with the cover disks in the working position, and FIG. 3 is an end view of a permanent-magnet clutch ring.

An apparatus for coating base plates with magnetic dispersion by the spin-coating process consists essentially of a motor-driven shaft whose free end is provided with clamping means in which the base plate to be coated, usually of aluminum or an aluminum alloy, is clamped, and also of a system of cleaning elements and nozzles for applying the magnetic dispersion, which system can be moved radially over the base plate and parallel to the plane thereof. It is convenient to provide a splash cover which accomodates the clamped base plate and the cleaning elements and nozzles and serves to collect the excess magnetic dispersion, particularly during centrifuging of the base plate after application of the magnetic dispersion.

FIGS. 1 and 2 illustrate the apparatus of the invention in the position of rest (FIG. 1) and working position (FIG. 2) for simultaneously coating the base plate 3 on both sides. This apparatus includes round cover disks 9,9′, one on each side of the base plate 3 held in the clamping device 2, which cover disks are parallel to the plane of the base plate and have a diameter which is at least as great as that of the base plate 3, the cover plates 9,9′ being located at the same short distance from the base plate 3 during centrifuging of the latter and arranged to rotate with the base plate 3 during the centrifugal coating operation at at least approximately the same speed (cf. FIG. 2). The most favorable aerodynamic effect of the cover plates 9,9′ on the magnetic dispersion spreading over the base plate during centrifuging is produced when the distance between the cover plates and the base plate is from 2 to 20 mm, which distance can be increased by axial displacement of the cover disks or pivoting them to the side, for example in order to move the nozzles for applying the magnetic dispersion across the surfaces of the base plate 3 to be coated. The above-mentioned system of radially movable cleaning elements and dispersion applying nozzles has been designated in FIG. 1 by the reference numerals 22 and 23, respectively.

In a preferred embodiment of the apparatus of the invention, the shaft 7 of the driving spindle 1 is rotatably mounted in a tube 8 mounted on a suitable frame 11. A bearing bush 10 is mounted for rotation and axial displacement on said tube 8. A cover plate 9 is secured to said bearing bush 10, for example by means of screws, at the end facing the base plate 3. Axial displacement of the bearing bush 10 in the directions indicated by the double arrow A is effected by a piston rod 13 associated a hydraulically or pneumatically operated cylinder 12 mounted on a frame 11. A guide rod 14 is additionally provided to improve guidance of the bearing bush 10. The distance between the base plate 3 and cover disk 9 in the working position can be adjusted by means of inductive or capacitive sensors 15. If desired, stops may be used in place of the sensors.

The second cover disk 9' for the other side of the base plate 3 is similarly mounted for displacement and rotation. The tube 8' for this cover disk 9' carries the splash box 6 at its free end. This tube 8' and the cylinder 12' serving to displace the bushing 10' are mounted on an L-shaped support 16 which is displaceable relative to a fixed guide 17 in the directions shown by the double arrow B, such displacement being effected by a cylinder (not shown) in a direction parallel to the common central axis 18 of the tubes 8, and the driving spindle 1.

As mentioned above, the advantageous effect of the cover disks 9,9' as regards the uniformity of distribution of the magnetic dispersion over the disk surfaces is only achieved if the said cover disks rotate with the base plate 3, during the centrifugal coating operation, in the same direction and as far as possible at the same speed. For this purpose separate driving motors may for example be provided for each cover disk 9,9', the speed of which is regulated by a suitable control circuit governed by the speed of the drive for the base plate 3 such that the base plate 3 and cover disks 9,9' rotate at the same speed.

It has been found to be particularly advantageous for the cover disks 9,9' to be driven by the driving spindle 1 for the base plate 3. When the cover disks 9,9' approach the base plate 3, the said driving spindle 1 is already in rotation as a result of the operation for applying the magnetic dispersion. This rotation is transmitted to the cover disks 9,9' by means of a magnetic clutch whose parts do not contact each other, unlike the parts of a friction clutch, to avoid the formation of dust. Particularly suitable are permanent-magnet clutches, preferably commercially available end-on magnetic clutches (P. Gernhardt, "Dauermagnetische Kupplungen", DEW-Technische Berichte 2 (1962), pp. 153 to 159).

As shown in FIGS. 1 and 2, two annular permanent magnets 19 are mounted on the driving spindle 1 coaxially therewith, one on each side of the base plate 3 and secured to the sides of the clamping means 2 to form the driving clutch elements. These permanent magnets are screened on all sides, except for the side remote from the base plate 3, by a casing 20 of "soft" magnetic material. The permanent magnets 19 consist of an even number of segments 21 of alternating polarity (FIG. 3). The driven elements of the clutch consist of similar permanent magnets 19' partially enclosed by casings 20' which are mounted on the bushings 10,10' of the cover disks 9,9' behind the central hole in the latter and in mirror-image relationship to the permanent magnets 19 forming the driving elements of the clutch. In the working position (FIG. 2) of the two cover disks 9,9', the driving and driven clutch elements formed by the permanent magnets 19,19' are at a distance from each other of from 0.2 to 3.0 mm and preferably from 0.3 to 0.8 mm. There is therefore no friction between the torque-transmitting clutch elements.

The commercially available permanent magnets are preferably made of barium ferrite. If, for example, the individual permanent magnets 19,19' have an external diameter of 100 mm, an internal diameter of 50 mm and a thickness of 15 mm, and if the air gap between the permanent magnets is 1 mm, the said permanent magnets are capable of transmitting rotary motion up to a torque of 28,500 g-cm. This torque ensures troublefree starting of the cover disks 9,9', each of which has a weight, together with the rotatable parts, of, say, 400 g, even at a speed of the rotating driving spindle 1 and base plate 3 of 400 r.p.m. up to synchronous rotation of the clutch elements and hence of the base plate and cover disks.

It will be appeciated that the permanent-magnet clutch may be replaced by any other type of clutch whose parts are not in contact with each other, for example fluid clutches. The choice of the type of clutch is determined by the particular design and operating conditions of the coating apparatus as a whole.

Suitable materials of construction for the cover disks are plastics materials or aluminum, preferably acrylic glass. The surfaces of the cover disks are smooth and plane and their thickness is from 0.5 to 60 mm and preferably from 1 to 4 mm.

The two cover disks 9,9' are brought into their working position (FIG. 2) by displacement of the bushings 10,10' by means of the cylinders 12,12', after the nozzles have returned to their position of rest after application of the magnetic dispersion. The splash box 6 is moved into position over the base plate 3 by displacement of the support 16 by means of a cylinder (not shown), prior to cleaning of the base plate and application of the magnetic dispersion thereto. During the coating operation the speed of the base plate ranges from 400 to 3,500 r.p.m. A low speed is used during application of the magnetic dispersion, and this is raised to the centrifuging speed after the cover disks 9,9' have been moved into position, in order to distribute the magnetic dispersion uniformly over the surfaces of the plate. Thus, transmission of the rotation of the drive spindle with the base plate to the two cover disks 9,9' commences at low speed. Following the centrifugal coating operation, the cover disks 9,9' and the splash box 6 are returned to their position of rest to enable drying means to be swung over the magnetic layers on the base plate 3.

The cover disks 9,9' may be replaced by one or more base plates 3. In this case, the two driving spindles and clamping means for the base plates are mounted on a common driving shaft to rotate therewith, one base plate being displaceable along the driving shaft via a ball-bearing bush. No clutch arrangement is required as both base plates are driven by the common driving shaft. For the application of the magnetic dispersion a nozzle is associated with each of the two sides of the base plates facing each other, which nozzles are combined to form a radially movable twin nozzle having a common supply line.

The apparatus of the invention is suitable for integration in an automated manufacturing process. The control of the operations relating to this apparatus does not form part of the invention and has therefore not been described.

Tests carried out with an experimental model of the apparatus of the invention have shown that, compared with magnetic coatings manufactured in a conventional manner, there is achieved a substantial improvement in the surface quality, resulting in a much more uniform playback signal and much steadier head flight.

We claim:

1. An apparatus for the manufacture of the magnetic coatings of magnetic disks by application of a pourable magnetic dispersion to both surfaces of a rotating base plate, followed by centrifuging of the base plate, said apparatus comprising
   a clamp unit for the base plate to be coated,
   a shaft driving said clamp unit,
   means for cleaning the base plate and a unit for applying the magnetic dispersion,
   a pair of flat covering elements mounted opposite said two surfaces, respectively, of said base plate and coaxially with said shaft,
   means for axially moving each said element from an inoperative position to an operative position spaced by a short distance from the respective surface of said base plate, and
   clutch means, whose parts are not in contact with each other, for connecting said flat covering elements to said base plate for rotation in the same direction with said base plate during the centrifuging operation.

2. An apparatus as claimed in claim 1, wherein the covering elements are in the form of disks having a diameter which is at least equal to that of the base plate.

3. An apparatus as claimed in claim 1, wherein each side of the base plate is rigidly connected to at least one magnet and each covering element is rigidly connected to at least one magnet, said magnets, in said operative position, being disposed axially opposite each other and at a short distance from each other.

4. An apparatus as claimed in claim 2 wherein said disks are in the form of further base plates to be coated.

5. An apparatus for the manufacture of the magnetic coatings of magnetic disks by application of a pourable magnetic dispersion to both surfaces of a rotating base plate, followed by centrifuging of the base plate, said apparatus comprising
   a clamp unit for the base plate to be coated,
   a shaft driving said clamp unit,
   means movable generally radially to said shaft for cleaning, and for applying the magnetic dispersion over, the two surfaces of said base plate,
   a pair of flat covering elements mounted opposite said two surfaces, respectively, of said base plate and coaxially with said shaft for rotation in the same direction with the base plate during the centrifuging operation, and
   means for moving each said element between an inoperative axial position in which it is relatively widely spaced from the respective surface of said base plate and an operative axial position in which it is relatively closely spaced from said surface.

* * * * *